Dec. 5, 1961     M. A. WEISS     3,011,336
DROPLET SAMPLING PROBE
Filed April 30, 1957
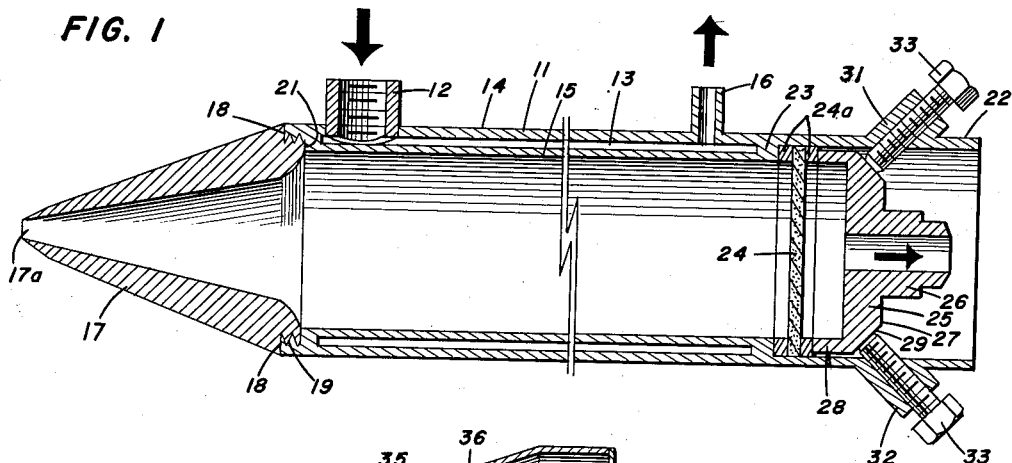
FIG. 1
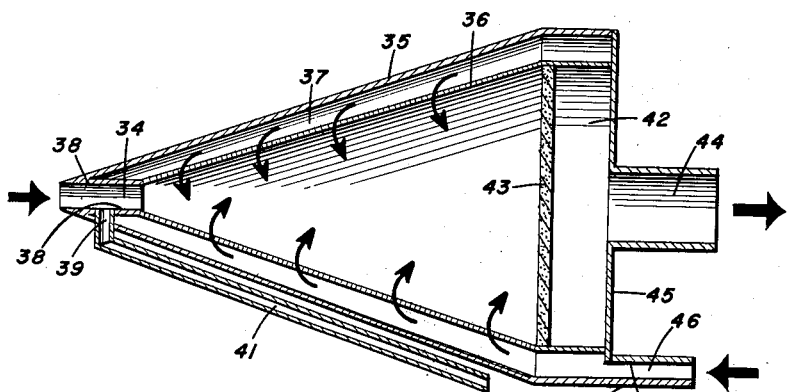
FIG. 2
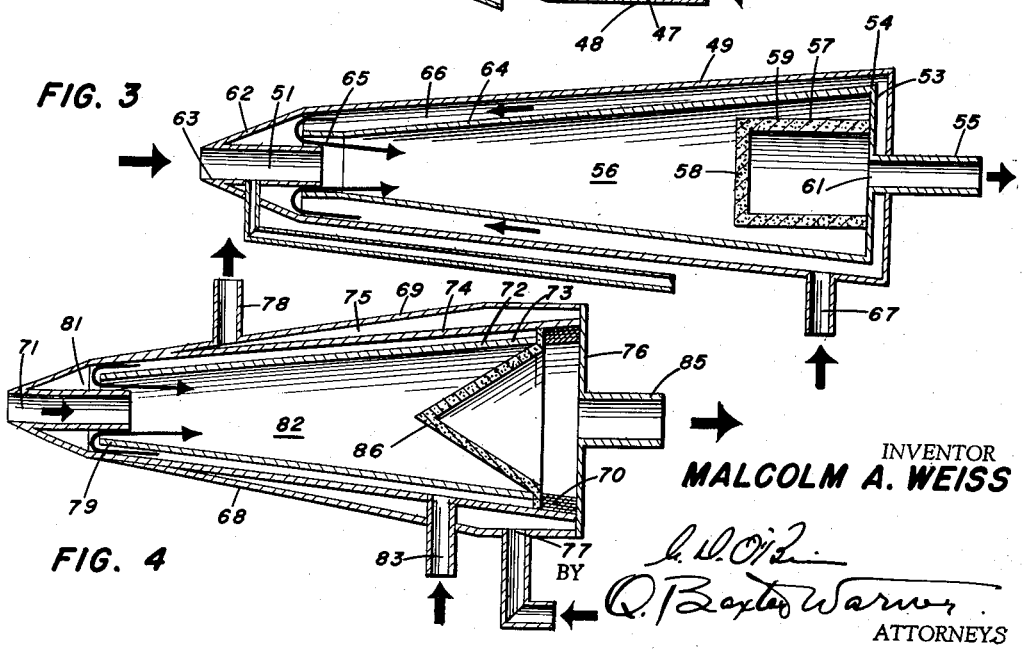
FIG. 3
FIG. 4
INVENTOR
MALCOLM A. WEISS
BY
ATTORNEYS

United States Patent Office 3,011,336
Patented Dec. 5, 1961

3,011,336
DROPLET SAMPLING PROBE
Malcolm A. Weiss, Union, N.J., assignor, by mesne assignments, to the United States of America as represented by the Secretary of the Navy
Filed Apr. 30, 1957, Ser. No. 656,165
3 Claims. (Cl. 73—29)

The present invention relates to a droplet sampling probe and more particularly to a droplet sampling probe having a compartment which simultaneously collects and freezes droplet samples taken from a gaseous stream.

It is frequently desirable to know the size distribution of droplets resulting from the injection of a liquid into a gas stream. Such injection occurs, for example, on spraying fuel into a jet engine stream or on spraying quench water into a stream of hot cracked gases. Knowledge of the droplet size distribution aids in predicting and assessing percentage of fuel combustion, for example, and, therefore aids in predicting performance of a jet engine when the gaseous fuel stream has certain characteristics as compared with streams of other characteristics. However, it is difficult to measure the drop sizes in a stream of high velocity, and it is believed that there are no known schemes for accurately accomplishing such a measurement.

Present techniques for obtaining droplet sizes in a gas stream, particularly one of high velocity, suffer from uncertainties. For example, in the measurement of drop size by apparatus presently known, whether obtained by observing impact images on a coated slide or by weighing deposition on scaled impactors or other means, it has been found that the measurement is not accurate. Furthermore, it has been determined that droplet measurements in high velocity gas streams by conventional apparatus lack reliability as to whether or not the sample examined is representative of the material in the stream due to the "collection efficiency" phenomenon which causes any object in a stream to be hit preferentially by larger drops. Some known sampling techniques suffer both of these uncertainties.

The sampling probe of the present invention obviates the foregoing uncertainties or lack of reliability inherent in measurements taken with the known prior art sampling probes. There is no uncertainty about either the measured drop sizes or the representativeness of the sample because the droplets are removed by a novel probe which simultaneously collects and freezes the undisturbed particles. The frozen spherical droplets can then be analyzed by any technique conventionally used for solid particles.

Therefore, an object of the present invention resides in the provision of a sampling probe which simultaneously collects and freezes droplets for size measurement.

Another object is to provide a method for obtaining representative droplet sizes of liquid particles flowing in a high velocity gas stream.

A further object of the invention is the provision of a probe which will collect and freeze droplets existing in a gas stream for analysis of the frozen droplets by conventional means.

Still another object is to provide a probe which is of a small cross section and which has a nose-included angle of such acuteness as to be effective to minimize disturbance of the high velocity gaseous flow upstream from the position of the sampling probe.

A still further object of the invention resides in the provision of a sampling probe having means for chilling liquid particles in a gaseous stream flowing through the probe in a manner such that the liquid particles do not strike each other or any surface and are not subject to large velocity gradients before freezing thereby ensuring that drops do not shatter or coalesce before freezing.

Other objects and many of the attendant advantages of this invention will be readily appreciated as the same becomes better understood by reference to the following detailed description when considered in connection with the accompanying drawings wherein:

FIG. 1 is a longitudinal sectional view of one embodiment of the invention;

FIG. 2 illustrates a longitudinal sectional view of another embodiment of the invention;

FIG. 3 is a longitudinal sectional view of a third embodiment of the invention; and FIG. 4 is still another embodiment of the novel sampling probe in longitudinal section.

Referring now to the drawings, wherein like reference characters designate like or corresponding parts throughout the several views, there is shown in FIG. 1 an elongated double-walled cylinder 11 or duct provided with a coolant entry boss 12 at the forward end thereof which provides communication between the jacket 13, formed by concentric walls 14 and 15 of the cylinder 11, and a source of coolant, not shown, such as water, for example. To enable circulation of the coolant within the jacket 13, there is located on the rear portion of the cylinder an outlet passage fixture 16 which connects the space between walls 14 and 15 with suitable means, not shown, for forcing a coolant from a coolant source, through coolant entry boss 12 into jacket 13 and out through fixture 16 in the conventional coolant jacket circulating fashion.

Removably secured to the forward end of cylinder 11 and adjacent coolant entry boss 12 is positioned in longitudinal alignment with the cylinder a hollow conical probe nose 17 having a small orifice 17a at the apex thereof. Orifice 17a constitutes an inlet nozzle for receiving samples from a fluid stream and for directing the flow into cylinder or compartment 11. The double-walled cylinder 11 is machined, or manufactured in any other suitable manner, so as to have an annular seat 18 onto which nose 17 may be fastened by any means found suitable for the purpose such, for example, as by screw threads on the inner periphery 19 of seat 18, such threads being formed to mate with a threaded rear shoulder 21 provided on nose 17.

To the rear of the double-walled cylinder 11, a longitudinal continuation of the external cylindrical wall 14 forms an open-ended tube portion 22. An annular flange 23 depends inwardly from the external wall 14 to define the forwardmost end of tube portion 22 and also functions to close the downstream end of jacket 13.

A flattened porous disk 24, which may be of the metallic type, for example, conforms in size and shape to the vertical cross section of tube portion 22 and is slidably received by the open end of tube portion 22. Porous disk 24 circumferentially abuts annular flange 23 and is releasably secured in this position by means of a disk retainer 25. Disk retainer 25 is also of a cross-sectional configuration which conforms with that of tube portion 22 into which it is slidably received. The disk retainer is provided with a centrally disposed nipple 26 of a smaller external diameter than the internal diameter of tube portion 22 and extends rearwardly from body section 27 of retainer 25 for connection to a meter and vacuuming apparatus, not a part of the instant invention, for a purpose to be explained hereinafter. The forward face of retainer 25 is of cup-shaped configuration formed by a forwardly extending circumferential flange 28 which is integral with the body section 27 of retainer 25. The side 29 of the body section is convergently tapered toward the rear at an angle substantially perpendicular to the axis of diametrically opposed tapped fittings 31 and 32 fixed to the wall of tube portion 22. Threaded members such as setscrews 33 are turned in fittings 31 and 32 and through the wall of tube portion 22 to frictionally engage the tapered side 29 of retainer 25 to urge and securely retain disk 24 in tight abutting relationship with flange 23. It will be understood that any suitable type seal 24a may be employed for sealing the periphery of disk 24 between retainer 25 and cylinder 11.

Referring now to the modification shown in FIG. 2, it will be understood that the probe configuration may be that of a cone having an inlet nozzle 34 at the apex of the cone. The cone includes an outer wall 35 concentrically spaced from an inner wall 36 so as to provide an annular space 37 into which a coolant, either liquid or gas, may be introduced from the rear of the coneshaped walls 35 and 36. The forward ends of walls 35 and 36 are connected to one another by closure member 38 to form the throat for nozzle 34. In the throat of nozzle 34, a conventional static pressure tap 39 is provided which is connected to a suitable pressure manometer, not shown, by means of conduit 41. The walls 35 and 36 of the probe shown in FIG. 2 diverge rearwardly to form a double-walled cone extending from the inlet nozzle to an area slightly forward of the downstream end. At the rear or downstream end portion of the probe is a double-walled cylindrical base section 42 into which is received a filter disk 43 of such size as to slidably fit into the base section 42 and yet be limited in forward movement by engagement with the internal conical wall 36. A retaining means, not shown, may be used to releasably maintain disk 43 in position to filter particles within a gas stream entering nozzle 34 of the probe. After passing through disk 43, the gas stream exhausts through pipe 44 which is centrally disposed on and extends through an end closure plate 45. The structural features of the probe base section 42, end plate 45, and pipe 44 may be varied, as can be well understood, without departing from the spirit of the instant invention.

A unique coolant system is provided in the modification of the invention disclosed in FIG. 2. A port 46 in plate 45 is formed, for example, by an end plate extension 47 normal to the plane of the plate and spaced apart from a trailing piece 48 of outer wall 35 of the probe. A gaseous or liquid coolant is introduced through port 46 into space 37 between the walls 35 and 36. The coolant then travels through inner wall 36 which is of porous material and into the gas stream. By direct contact of the coolant with particles in the gas stream to be sampled, the particles are frozen and are caught on the upstream side of disk 43 while the filtered gas passes through disk 43 and is exhausted through the pipe 44. The frozen samples collected on disk 43 can then be removed from the probe and analyzed by conventional techniques.

The pressure tap 39, hereinbefore mentioned, is provided in the nozzle 34 of the probe of FIG. 2 in order to record the static pressure in the straight nozzle 34 of the probe nose. By this arrangement it is possible to maintain the entrance velocity of the gas stream equal to the local stream velocity for the purpose of achieving a realistic sampling of the droplet distribution in the stream.

There is shown in FIG. 3 a further modification of the invention of FIG. 1. The probe 49 is double-walled as in the other embodiments of the present invention. Also, as in the other embodiments, the inlet nozzle 51 is at the apex of a conical body. A removable probe base 53 is connected by suitable means to the rear portion 54 of the double-walled conical probe 49 and is provided with an exhaust pipe 55 which communicates the hollow cone interior 56 with an exhaust pump or the like, not a part of the invention. To the base 53 is removably fastened by conventional means, not shown, a cup-shaped filter 57 with the closed end 58 thereof extending into the interior 56 of the probe. Side 59 of the filter surrounds the exhaust outlet 61 in such a manner that the filter is centrally disposed within the probe interior and is centered on the exhaust outlet 61. In this fashion the exhaust pressure is exerted equally on all areas of the screen 57 and equal distribution of particles of the gas stream on the filter is effected. Nozzle 51 is formed by an abrupt convergence of outer conical wall 62 toward the forward end of the probe. A cylindrical nozzle wall 63 is centrally disposed in the conical apex of the probe. The inner wall 64 does not close on the outer wall 62 of the cone at the apex, but instead is so formed as to extend divergently between outer wall 62 and nozzle wall 63, as at 65, and terminates short of wall 62. This design enables a coolant to be rapidly transferred from space 66 between the outer and inner walls 62 and 64, respectively, into the interior 56 of the probe through the passage 65 defined by the inner wall 64, outer wall 62 and cylindrical nozzle wall 63. A suitable coolant is supplied to the probe through inlet tube 67 which is in fluid communication with the space 66 between the probe walls.

FIG. 4, which illustrates a further modification of the probe shown in FIG. 1, includes a probe with an outer modified conical shell 69 and a nozzle 71 conforming in design to the corresponding probe elements of the probe disclosed in FIG. 3. A primary coolant jacket 72 is concentrically disposed with respect to the outer shell 69 and includes a conical inner wall 73 spaced apart from an overlying outer wall 74. The conical taper of the outer shell 69 is nonparallel with the taper of the walls of primary jacket 72. A secondary coolant jacket 75 is formed by the outer wall 74 of the primary jacket 72 and the outer shell 69 of the probe. Shell 69 and wall 74 converge in a forward direction and are joined in sealed relationship in close proximity to the nozzle end of the probe. Shell 69 and wall 74 are closed at their bases by a probe end closure 76. Thus, it will be apparent that the secondary coolant jacket 75 constitutes a closed chamber with an inlet port 77 located near the base of the conical probe for the introduction of secondary coolant into coolant jacket 75. An outlet port 78 is provided in the outer shell 69 adjacent the juncture of the secondary coolant jacket walls.

The primary coolant jacket 72 shares wall 74 with the secondary coolant jacket 75. The inner wall 73 of the primary coolant jacket is spaced from wall 74 by any suitable means such, for example, as by a ring flange 70 depending perpendicularly from the common wall 74 adjacent to and in parallel-spaced relation with respect to the removable end closure 76 of the probe. The forward end 79 of wall 73 is arranged with respect to the outer shell 69 and nozzle 71 in such a manner as to provide a passage 81 for establishing fluid communication between the primary coolant jacket 72 and the probe interior 82. The primary jacket 72 is provided with a direct coolant entry fixture 83 which extends from the exterior of shell 69 through the secondary coolant jacket 75 and into the primary coolant jacket 72.

The cooling circuit for the primary coolant is from the coolant source, not shown, through fixture 83 into primary coolant jacket 72 and then through passage 81 into the interior 82 of the probe. Thus, the primary coolant enters the gas stream and is exhausted with the filtered gas rearwardly through exhaust fixture 85 extending centrally through end closure 76 of the probe. The secondary coolant is ported independently of the primary coolant making possible the use of a coolant with different properties than those of the primary coolant. The combination of the two independent cooling circuits affords an efficient mode of cooling the gas stream particles rapidly to their freezing points before striking a conical filter 86 which is releasably secured by any suitable means within the probe and in engagement with the ring flange 70. Suitable retaining means such as snap-rings, O-rings, or threaded collars may be utilized to position filter 86 so that the base of the cone-shaped filter abuts the ring flange 70.

It will be understood that the probe is designed to be as small as possible in the largest cross section, and the nozzle or nose-included angle is designed to be as small as possible to minimize disturbance of the stream upstream of the sampling point.

The operation involved in the use of the present invention is carried out by first placing the probe in the gas stream from which particles are to be sampled and a sample of the gaseous stream enters the nozzle of the probe. If desired, the sampling stream velocity may be controlled either by measuring the exhaust gas flow with a suitable meter or by making the static pressure in the probe nose equal the stream static pressure. Inside the probe, the stream, including liquid particles carried thereby is chilled in a manner such that the liquid particles do not strike each other or any surface and are not subjected to large velocity gradients before freezing. These requirements ensure that drops do not shatter or coalesce before freezing. After freezing, the frozen droplets are removed from the stream by the filter medium which is fine enough to scrub the smallest particles of interest. The scrubbed gases then exhaust. In some installations it may be desired to pass the scrubbed gases through a pump before exhaust in order that the gases will pass through the probe at the proper velocity.

The chilling technique chosen may depend on the temperature required to freeze the particles. A simple cold wall may be used as shown in FIG. 1, or a liquid or gaseous cooling agent may be introduced within the probe to mix directly with the gas stream. Examples of the latter chilling technique are shown in FIGS. 2, 3, and 4. The design shown in FIG. 1 has been used successfully to freeze and remove droplets of molten wax from a 300° F. air stream flowing at a velocity of 300 ft./sec.

Obviously many modifications and variations of the present invention are possible in the light of the above teachings. It is therefore to be understood that within the scope of the appended claims the invention may be practiced otherwise than as specifically described.

What is claimed is:

1. A droplet sampling probe comprising a removable probe nose of hollow conical configuration and open at both ends, an open-ended cylindrical compartment removably connected to the nose and in longitudinal alignment therewith, an inner wall concentrically positioned within the compartment, said inner wall and the compartment wall defining a space for receiving a coolant, said inner wall being of a length shorter than the length of the compartment wall so as to form an open-ended rear portion for the compartment, tapped fittings diametrically opposed on the cylindrical rear portion of the compartment, rotatable threaded fasteners removably secured within said fittings, a filter removably disposed within the rear portion of the compartment, filter retaining means disposed within the rear portion of the compartment in a position forward of said tapped openings and provided with a centrally-disposed exhaust nipple, said filter positioned by the filter retaining means in abutting relationship with the rear of the inner wall, said retaining means being operatively connected with said threaded fasteners for movement into and out of retaining relationship with respect to said filter in response to rotation of said fasteners.

2. A probe for capturing droplets from a gaseous stream flowing therethrough comprising a hollow conical nose open at the base and the apex, said nose having an inner wall and an outer wall arranged so as to form a continuous annular space therebetween, the outer wall at the apex of the conical nose being inwardly and rearwardly directed to form a throat for the nose, said inner wall at the apex of the conical nose terminating short of the inwardly directed outer wall and being located between the throat and the inwardly directed outer wall such that a passage is formed communicating the space between the inner and outer wall and the hollow conical nose, conduit means positioned near the base of the conical nose and passing through the outer wall for introducing a refrigerant into the space between the inner and outer walls, a base closure member having inner and outer walls contiguous with said first-mentioned inner and outer walls respectively, an exhaust conduit fixed to said closure member so as to pass longitudinally through said closure member, and filter means positioned on said closure member and extending longitudinally into the hollow conical nose toward the apex thereof and to surround the opening of the exhaust conduit in a manner to filter frozen droplets from a gaseous stream flowing through the nose, and a pressure conduit communicating with the throat and extending through the outer wall for connection to a flow velocity measuring means.

3. A hollow open-ended conical probe for freezing and capturing representative droplets contained in a gaseous stream comprising, a cylindrical member defining an inlet nozzle for capturing a portion of the gaseous stream, a frusto-conically-shaped outer shell converging onto and secured to the upstream end of said cylindrical member, a planar base member having a centrally located aperture formed therein, said base member being peripherally and removably attached to the outer shell at the base thereof, exhaust conduit means centrally fixed to the base in communication through the base aperture with the interior of the probe, a frusto-conically-shaped probe outer wall positioned within the outer shell and fixed to the shell inner surface at the base and intermediate the length of the outer shell so as to form a secondary coolant jacket surrounding the hollow conical probe interior, conduit means for introducing and withdrawing secondary coolant within the jacket, a probe inner wall substantially concentrically positioned within the outer wall and connected to the inner surface of the outer wall at a position forwardly spaced from said base member, said inner wall being spaced between the downstream end of said cylindrical member and the outer shell at the upstream end of the conical probe thereby providing a passage communicating the space between said probe inner and outer walls with the interior of the probe, conduit means for introducing a direct coolant into the space between the probe walls and thence through the passage to the interior of the probe for direct contact with a gas stream flowing through the probe, and removable filter means positionable adjacent the connection between the probe inner and outer walls so as to capture droplets within the stream frozen by refrigerating action of the direct coolant and the secondary cooling jacket coolant.

References Cited in the file of this patent
UNITED STATES PATENTS 984,047     Touzalin _____ Feb. 14, 1911
2,456,163    Watson _____ Dec. 14, 1948

OTHER REFERENCES

Sampling Particulate Matter, by R. L. Solnick, pages 120–124 of Oil and Gas Journal, October 15, 1956. (Copy in Division 36.) Class 73–28.